US009854105B1

(12) United States Patent
Krishnasamy et al.

(10) Patent No.: US 9,854,105 B1
(45) Date of Patent: Dec. 26, 2017

(54) METHOD AND APPARATUS FOR INSTANT SCANNING AND PROCESSING OF A DOCUMENT

(71) Applicant: Xerox Corporation, Norwalk, CT (US)

(72) Inventors: Muralidaran Krishnasamy, Tamil Nadu (IN); Narayan Kesavan, Tamil Nadu (IN); Surya Prakash Kotha, Tamil Nadu (IN); Ramesh Nagarajan, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/190,566

(22) Filed: Jun. 23, 2016

(51) Int. Cl.
*H04N 1/04* (2006.01)
*H04N 1/00* (2006.01)
*H04N 1/21* (2006.01)

(52) U.S. Cl.
CPC ..... *H04N 1/00037* (2013.01); *H04N 1/00007* (2013.01); *H04N 1/00082* (2013.01); *H04N 1/04* (2013.01); *H04N 1/2166* (2013.01); *H04N 2201/0094* (2013.01)

(58) Field of Classification Search
CPC ................................................ H04N 1/00037
See application file for complete search history.

(56) References Cited

U.S. PATENT DOCUMENTS

| | | | | |
|---|---|---|---|---|
| 5,860,066 A | * | 1/1999 | Rouse | G06Q 30/02 705/301 |
| 5,969,826 A | * | 10/1999 | Dash | H04N 1/00384 345/901 |
| 7,844,749 B2 | | 11/2010 | Tredoux et al. | |
| RE42,290 E | * | 4/2011 | Ogino | H04N 1/0035 358/474 |
| 8,817,319 B2 | | 8/2014 | Martin | |
| 9,009,359 B2 | | 4/2015 | Ashok et al. | |
| 9,185,245 B2 | | 11/2015 | Miyachi et al. | |
| 9,245,130 B2 | | 1/2016 | Ashok et al. | |
| 9,245,131 B2 | | 1/2016 | Ashok et al. | |
| 2005/0051942 A1 | * | 3/2005 | Kubo | B65H 3/44 271/9.09 |
| 2006/0132841 A1 | | 6/2006 | Park et al. | |
| 2006/0221372 A1 | | 10/2006 | Onishi et al. | |
| 2007/0109600 A1 | * | 5/2007 | Ren | G06K 15/02 358/1.18 |

(Continued)

*Primary Examiner* — Ibrahim Siddo
(74) *Attorney, Agent, or Firm* — Fox Rothschild LLP (57) ABSTRACT

A system and method for automatically scanning a physical document and performing processing actions on the scanned document are provided. The system may include a scanning device that can detect a trigger event when a portable memory device is connected to or paired with the device or when a document, including one or multiple pages, is placed on the document handler of the device. Upon detecting the trigger event, the scanning device may retrieve scan instructions from a designated folder on the portable memory device, automatically scan the document on the document handler, and perform various processing actions on the digital document file for the scanned document based on the scan instructions, with little or no user interaction. The processing actions may include storing, faxing, emailing the scanned document. The instructions for each processing action may be stored at one of multiple designated folders of the portable memory device.

23 Claims, 5 Drawing Sheets

(56) References Cited

U.S. PATENT DOCUMENTS

| | | |
|---|---|---|
| 2007/0229899 A1 | 10/2007 | Okuda |
| 2008/0080001 A1 | 4/2008 | Yamada |
| 2008/0198412 A1 | 8/2008 | Yamada |
| 2009/0128862 A1* | 5/2009 | Nolepa .............. H04N 1/32042 358/402 |
| 2010/0231968 A1 | 9/2010 | Hirasawa et al. |
| 2011/0085205 A1 | 4/2011 | Ouchi |
| 2011/0242580 A1 | 10/2011 | Tran |
| 2011/0292430 A1* | 12/2011 | Kang ................ H04N 1/00347 358/1.13 |
| 2012/0140266 A1 | 6/2012 | Takayama |
| 2012/0194850 A1 | 8/2012 | K. et al. |
| 2012/0218605 A1 | 8/2012 | Yamada |
| 2012/0307316 A1* | 12/2012 | De Muelenaere . H04N 1/00222 358/444 |
| 2013/0120799 A1 | 5/2013 | Maeda |
| 2017/0139652 A1 | 5/2017 | Kesavan et al. |

\* cited by examiner

METHOD AND APPARATUS FOR INSTANT SCANNING AND PROCESSING OF A DOCUMENT

BACKGROUND

This disclosure relates to scanning and processing a document and particularly to scanning and processing a document instantly with little or no user activation of a local user interface (LUI).

In performing a conventional scanning job in a document system or a multi-function peripheral (MFP), such as scan-to-storage medium (e.g., hard drive or other memory), scan-to-email or scan-to-fax, a user normally needs to perform several steps. For example, in a normal scan job, the user needs to place the documents on the handler, use the LUI to enter the file directory in which the scanned document files will be stored, then push the "start" button to start the job. In a scan-to-email or scan-to-fax job, the user needs to place the documents on the handler, use the LUI to enter an email address or fax number of the recipient (or select from an address book), or customize the necessary options related to the transmission, and then push the "start" button to start the job. In a networked environment, a user may select to scan and email to him/herself. However, the user still needs to login to identify him/herself to the system and push the "start" button. Alternatively, templates can be created offline and uploaded onto the device. However, these various systems and methods for scanning and transmitting a document can still be cumbersome to users.

This document describes a system that may address at least some of the issues described above.

SUMMARY

In one embodiment, a scanning device for automatically scanning and processing a document may include a port for communicating with a portable memory device, an image sensor, a processing device communicatively coupled to the port and the image sensor, and a non-transitory computer-readable medium containing program instructions. The program instructions may be executed by the processing device to detect a trigger event that may indicate that a document is ready to scan. The trigger event may occur when a portable memory device is communicatively connected to the port, or when a document is placed on the document handler. Upon detecting the trigger event, the scanning device may automatically retrieve a scan instruction, and automatically cause the image sensor to scan a document and generate a digital document file for the scanned document based on the retrieved scan instruction. The scanning device may further perform a processing action on the digital document file based on the retrieved scan instruction.

Alternatively and/or additionally, the portable memory device may include a file system having a folder of a designated name, which may be designated to store the scan instructions and/or store any digital document files for the scanned document. The scan instructions may include various settings related to the scanning of the document (e.g. resolution, document/image mode, compression mode etc.) and other processing actions. For example, other processing actions on the digital document file for the scanned document may include transmitting, e.g. emailing or faxing, the document file to a destination address. In one embodiment, the scan instructions may include one or more email addresses, or one or more fax numbers for receiving the scanned document.

In one embodiment, the portable memory device may include one or more additional folders of different designated names, each folder storing instructions for performing a different additional processing action. For example, one folder may be designated to store the scan instructions and/or store the digital document files of scanned documents; another folder may be designated to store instructions for faxing documents, and another folder to store instructions for transmitting documents by email. In one embodiment, the scanning device may be capable of detecting additional folders of different designated names, and sequentially performing additional processing actions corresponding to each of the additional folders of the different designated names, with little or no user interaction.

In one embodiment, the scan instruction may include the maximum number of scans, and the scanning device may be capable of repeatedly scanning multiple documents, each repeat being triggered by detecting that an additional document is being placed on the document handler after each scan. In one embodiment, the scanning device may count the number of scans and determine to suspend scanning additional documents when the number of scans exceeds the maximum number of scans.

In one embodiment, the scan instruction may also include a one-file-per-page setting. This allows a user to place multiple single-page documents on the document handler of the scanning device and scan all documents at once without repeatedly placing and scanning each individual document. Upon extracting the one-file-per-page setting from the scan instruction, the scanning device may scan all of the documents on the document handler at once, and store these documents in multiple digital document files to the portable memory device, each document file containing a digital representation of a page of the document.

Optionally, if the scanning device detects a trigger event, e.g. when a portable memory device is connected to or paired with the scanning device, but no physical document is placed on the document handler, the device may output a message via a user interface to prompt the user to load a document to the document handler.

Optionally, a system for automatically scanning or performing processing actions on a document using the scanning device described in this document may be capable of pre-configuring the scan instruction, such as configuring an instruction file on a USB flash drive through a web-UI or a device.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

The term "local user interface" or "LUI" of a device refers to a user interface peripheral that is mounted to or built in an electronic device for users to perform various operations on the device. A local user interface typically includes a combination of hardware (such as a keyboard, keypad, touch-sensitive display and/or microphone) and software for presenting prompts to a user and receiving input from the user via the hardware.

The term "portable memory device" refers to a portable device that has non-transitory storage medium capable of storing data, such as a universal serial bus (USB) flash drive, a secure digital (SD) card or microSD card, a portable hard disk, a portable media player or any other external storage device that has such storing capability. In various embodiments, the portable memory device does not need to include a processor. The portable memory device will typically have a file system. The portable memory device will include a data transfer device, such as a USB connector for a USB drive, input/output ports of an SD card or a radio unit (transceiver) of a near-field communication device such as a Bluetooth device.

A "computer" or "computing device" refers to a device that includes a processor and non-transitory, computer-readable memory. The memory may contain programming instructions that, when executed by the processor, cause the computing device to perform one or more operations according to the programming instructions. Examples of computing devices include personal computers, servers, mainframes, gaming systems, televisions, and portable electronic devices such as smartphones, smart watches, wearable electronic devices, digital cameras, fitness tracking devices, tablet computers, laptop computers, media players and the like.

The term "physical document" refers to a hard-copy document printed on a substrate and that can be scanned into a digital form. It may consist of a single sheet or a set of sheets or pages, which may include text, graphics, and/or images.

The term "digital document file," "document file," "electronic document" or "electronic document file" refers to a digital representation of a document such as a word processor file, a PDF file, or a bitmap file (e.g. TIFF, JPG, PNG files etc.) that is stored in a computer readable memory or a storage medium. A document file may be an electronic representation of a document that contains multiple pages.

The term "document system" refers to a system of devices that communicate with each other for handling document related jobs, in particular, printing, copying, electronic storing, facsimile, transmitting or receiving (including fax, email, or communicating with a remote device), and/or image scanning of a physical document.

The term "scan" refers to a process that generates a digital image representation of a physical document, which may consist of one or multiple page images, and the generating process may be organized into a document processing job.

The term "scanning device" refers to a machine or device having hardware capable of scanning of a physical document and creating an electronic file containing a digital image of the document. Components of a scanning device typically include an image sensor (such as a CCD array or contact image sensor), a glass plate for receiving the document, a lamp, and a processing device. In some embodiments, a scanning device may have additional capabilities and may be, for example, a multifunction print device.

The embodiments described in this document provide instant scanning of physical documents and transmission of corresponding document files using a portable memory device in various document systems.

Figure 1:
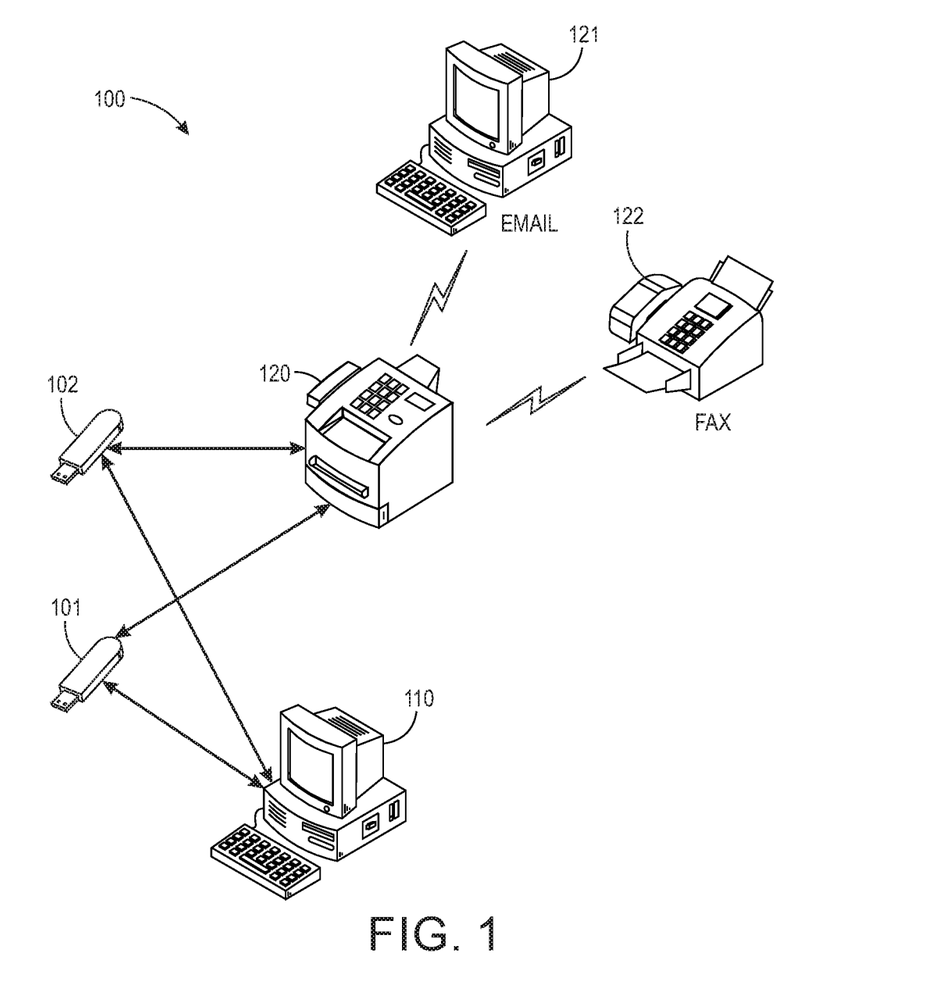
FIG. 1 illustrates a document system for instant scanning and processing of documents according to one embodiment.

With reference to FIG. 1, a document system 100 may include a scanning device 120, a computer 110, an email server and/or terminal 121, a fax machine 122 and/or communication links. The scanning device 120 is capable of reading a portable memory device 101, 102 for instantly scanning a physical document and storing or transmitting the scanned document file. The portable memory device 101, 102 may store instructions (e.g. an instruction file stored on a USB flash drive) for the scanning device to perform various operations. The scanning device 120 may extract the instructions from the portable memory device 101, 102 and perform various operations. The portable memory device 101, 102 may also be used to store document files that are generated by the scanning device 120. In one embodiment, the scanning device 120 can detect a trigger event, e.g., a portable memory device is plugged into or otherwise communicatively connected to the scanning device, and a physical document is placed on the document handler of the scanning device 120. Then the scanning device may read the instructions from the portable memory device 101, 102 or the scanning device and instantly scan the placed document and perform a document processing action on the scanned document based on the instructions. In one embodiment, the scanning device may automatically scan the physical document to create a document file and store the resulting document file onto the portable memory device in a designated folder. In another embodiment, the scanning device may scan the physical document and email 121 or fax 122 the digital representation of the scanned document, such as an electronic document file to a destination device. The address of the destination device for receiving the digital representation of the scanned document may be stored in the instruction file.

Alternatively and/or additionally, the portable memory device 101, 102 may be pre-configured with default instructions by a computing device 110 via a web user interface (web-UI). Alternatively, the computing device 110 may be used to create the file system on the portable memory device. Additionally, the user may plug the portable memory device in a computer and re-configure the instructions at any time.

Figure 2:
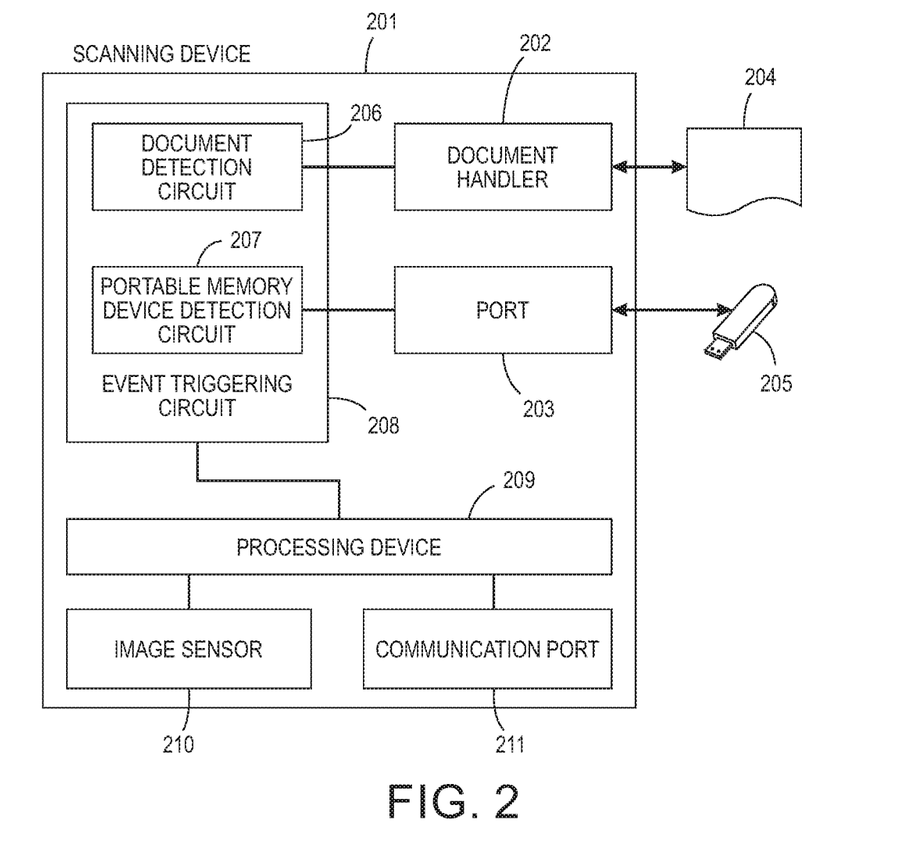
FIG. 2 illustrates a diagram of a scanning device according to one embodiment.

With reference to FIG. 2, various components in the document system are described in detail according to some embodiments. In one embodiment, the scanning device 201 may include a processing device 209 that is communicatively coupled to an image sensor 210 and a communicate port 211. The scanning device may also include a document handler 202, upon which a user can load one or more pages of a document 204. The scanning device will automatically scan the document pages placed on the document handler without user intervention. The scanning device may also include a port 203 for plugging in a portable memory device. Additionally, the scanning device may include an event triggering circuit 208 that triggers the scanning device to perform certain operations. The event triggering circuit may include a document detection circuit 206 that includes a circuit and a sensor that detects when a physical document is placed on the document handler. When the sensor detects that a physical document is placed on the document handler, the circuit may generate a trigger to the event trigger circuit, indicating that the document is ready to scan.

Alternatively and/or additionally, the event triggering circuit may include a portable memory device detection circuit 207 that may be communicatively coupled to the port 203. When a portable memory device 205 is plugged into the peripheral port 203, the portable memory device detection circuit may detect the status change of the port and subsequently generate a trigger to the event trigger circuit, indicating that user is initiating the scanning device and the instructions for subsequent operations of the scanning device may be available to retrieve from the portable memory device. Alternatively, a portable memory device may be communicatively coupled to the communication port 211 of the scanning device, and the scanning device may be capable of pairing with a portable memory device wirelessly, such as via Wi-Fi, Bluetooth or other near-field communication protocols.

Figure 3:
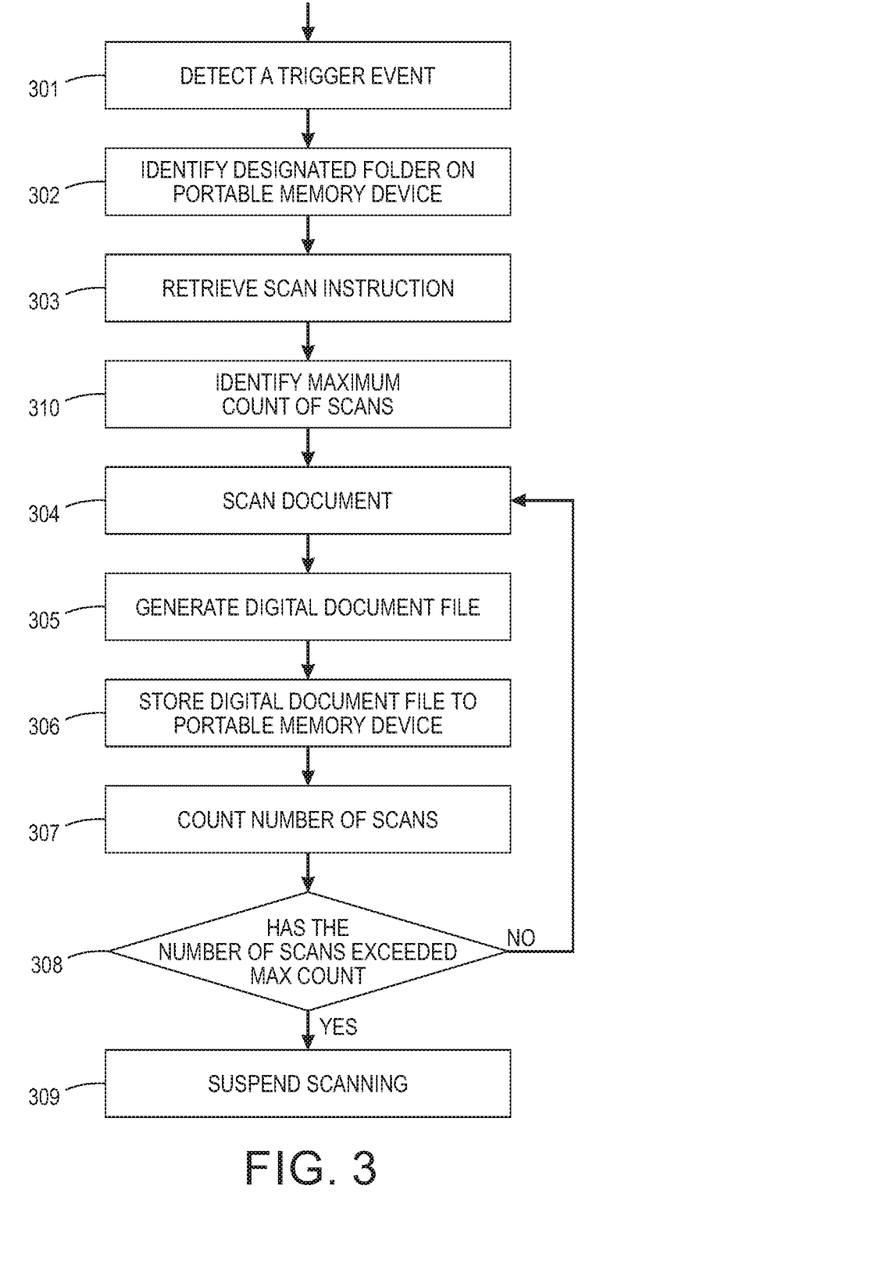
FIG. 3 is a diagram of instant scanning and storing documents according to one embodiment.

With reference to FIG. 3, methods for accomplishing various tasks in the system disclosed in the embodiments in FIG. 2 are provided. In one embodiment, a method for instant scanning of a document may include detecting a trigger event 301 that is indicative that the document is ready to scan. In one embodiment, detecting the trigger event may include receiving a trigger from the document detection circuit, indicating that a document is placed on the document handler. For example, the user has placed the first document on the document handler, where the first document may consist of single or multiple pages. In another embodiment, or additionally, detecting the trigger event may include receiving a trigger, indicating that a portable memory device is plugged into the port of or communicatively connected to the scanning device.

In one example, the user has plugged a USB flash drive into the scanning device. The USB flash drive may have a designated folder, e.g. "\insta-scan" or any other names designated for scanning and storing scanned document files. The scanning device will include program instructions configured to automatically take certain actions in response to detecting that a memory device with a file storage folder of the designated name has been communicatively connected to the scanning device. In one embodiment, the designated folder on the portable memory device may be designated for storing the scan instructions, such as scan resolution, file format for storing scanned document files, and/or the scan file naming convention. In one embodiment, the designated folder, or a sub-folder thereof, may also be designated for storing the scanned document files.

With further reference to FIG. 3, once the scanning device detects the trigger event, the scanning device may identify the designated folder on the portable memory device 302, e.g. "\insta-scan," and retrieve scan instructions from the designated folder 303. Alternatively and/or additionally, the designated folder may be a default folder or may be the root of the portable memory device file directory. In one embodiment, the scan instructions are contained in a scan instruction file, such as in the XML format, and the scanning device may parse the XML scan instruction file and extract relevant fields for scan instructions. Alternatively and/or additionally, the scan instructions may be stored in a non-transitory memory built in the scanning device. The scanning device may include program instructions that can retrieve scan instructions from a default file on the portable memory device (e.g. scan-instruction.xml) or may use default scan instructions stored in the scanning device.

In one embodiment, the scanning device may detect a trigger event by first detecting that a document is placed on the document handler. The scanning device may then assume that the portable device is connected or communicatively coupled to the scanning device, and then identify the designated folder on the portable device. If the portable memory device is not plugged in or paired with the scanning device, the scanning device may output a message to the user to prompt the user to connect the portable memory device, or it may wait for another command or action from the user. Alternatively, the scanning device may detect a trigger event by first detecting that a portable memory is connected to or paired with the scanning device. The scanning device may then check whether a document is loaded to the document handler. If no document is placed on the document handler, the scanning device may output a message to the user to prompt the user to load a document.

With further reference to FIG. 3, upon detecting the trigger event and retrieving the scan instructions, the scanning device may scan a document 304, which may consists of single or multiple pages, based on the scan instructions, generate digital document file of the scanned document 305, such as a JPG, PDF, TIFF or any other document format, and store the digital document file of the scanned documents to the portable memory device 306 in the designated folder. Storing the scanned document file may be based on the file naming convention that is included in the scan instructions. For example, the document file may be stored as "Myscan001" if the file naming convention specifies the file name prefix to be "Myscan."

The steps described above can repeat for scanning additional set of documents. Each additional set of documents may contain one or multiple pages. In one embodiment, upon user placing an additional set of documents on the document handler, the scanning device will detect that an additional document has been placed on the document handler, and then repeat the step of scanning the document 304, generating digital document file 305 and storing digital document file for the scanned document to the portable memory device 306. This process may repeat for an infinite number of documents until the user unplugs the portable memory device from the scanning device.

With further reference to FIG. 3, in one embodiment, the method may allow the system or user to limit the total number of scans. This maximum count of scans may be included in the scan instructions stored on the portable memory device or may be a default setting of the scanning device. In one embodiment, the scanning device may retrieve the scan instructions from the portable memory device and identify the max count of scans 310. Once a max count of scans is identified, each time the scanning device is repeating the scanning steps described above, the scanning device may additionally count the total number of scans 307 and check this number against the max count of scans 308. If the scanning device determines that the total number of scans exceeds the max count of scans, the scanning device may suspend scanning 309 and stops scanning and storing additional documents; otherwise the scanning device may continue scanning and storing additional documents.

Using the methods described in FIG. 3, a user may accomplish scanning multiple sets of documents without the use of the LUI. For example, the user walks to the document system and plugs in the portable memory device, e.g. a USB drive, to the scanning device. The scanning device identifies the presence of the "\insta-scan" folder (or other designated folder) and retrieves the scan instructions. Alternatively, the user may pair a portable memory device capable of near-field communication (NFC) or other wireless communications with the scanning device. The user places the first set of originals (e.g. a 3-sheet document) on the document handler. The scanning device then scans the first set of originals based on the scan instructions and stores a digital document file (e.g. PDF) of the scanned originals onto the portable memory device in the designated folder (e.g.

"\insta-scan"). Then the document is automatically removed from the document handler. The user may immediately place the next set of originals (e.g. a 5-sheet document) on the document handler, the scanning device detects that the second document is placed on the document handler and immediately scans and stores the digital document file for the second document. The user may place the third document (e.g. a 2-sheet document) on the document handler, and the scanning device will repeat the scanning and storing process. All these steps are performed automatically without the use of the LUI.

Alternatively and/or additionally, the system may allow a user to pre-configure to store the digital document files in one-file-per-page in the scan instructions. This will allow the user to perform more flexible and efficient scanning. For example, if the user wants to scan 10 one-page documents, instead of scanning the documents in 10 repeats as described above, the user may include a one-file-per-page option and a prefix for the file name in the scan instructions. Then, the user may stack the 10 one-page documents and place them on the document handler, and the scanning device may scan all of the 10 one-page documents once and save to 10 separate document files using the pre-configured prefix name, without performing the steps of "placing document" and "scanning" repeatedly.

In some embodiments, pre-configuration of scan instructions may be accomplished in various ways. For example, the user may plug in the portable memory device on user's own desktop (110 in FIG. 1) and pre-configure the scan instructions through a web-UI. In a networked document system, if an application is available for user to modify network and system settings of the system from a user's computer, each user can also use the application to frequently change the default settings. For example, in Xerox's CentreWare Internet Services (CWIS), each user may be given a separate "insta-scan" page to pre-configure or modify the default settings for scanning and storing documents. This can be a one-time activity or the user can change it any time.

With further reference to FIG. 3, when the system is capable of suspending a scanning job after the total number of scans has exceeded the max count, the scanning device will still allow user to perform other additional document related processing actions immediately following the scan job. For example, the scanning device may allow user to first scan and store 3 documents to the portable memory device, then fax/email additional documents without the need to unplug and plug the portable memory device from/in the scanning device, which will be described in this document.

Figure 4:
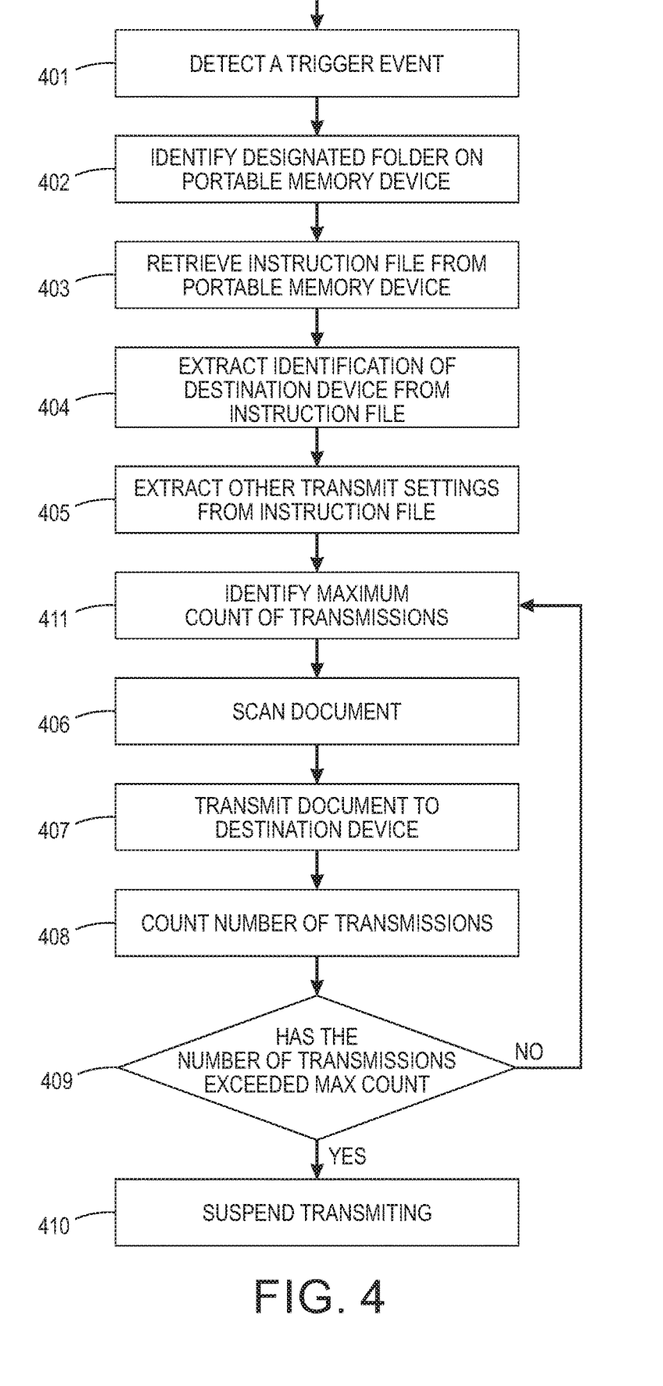
FIG. 4 is a diagram of instant scanning and transmitting documents according to one embodiment.
Figure 5:
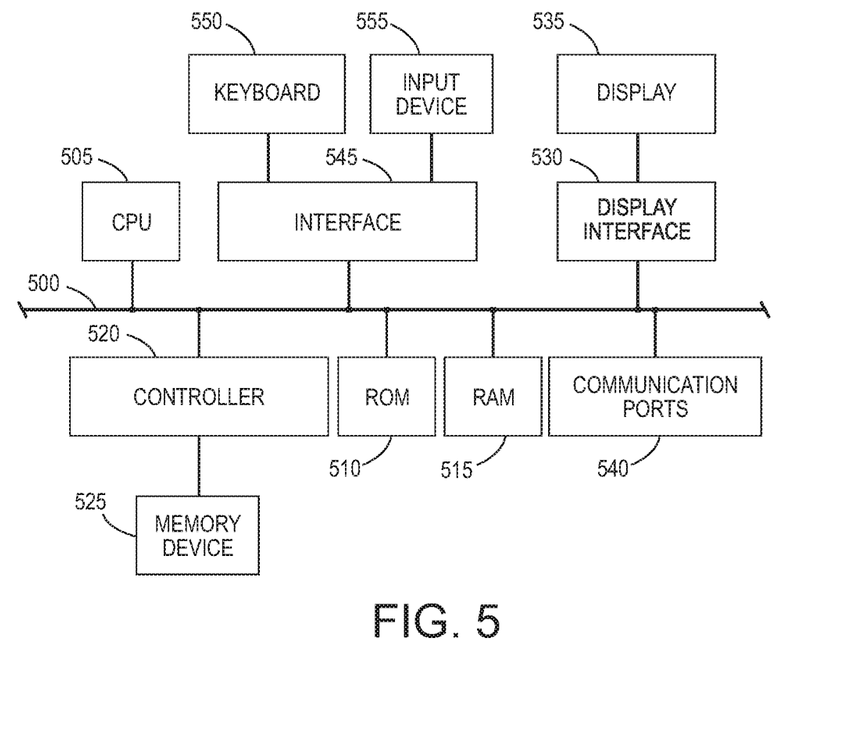
FIG. 5 is a block diagram of elements of a computing device on which the various systems and methods in this document could be implemented.

Returning to FIG. 2, the embodiments described in FIG. 2 may also be configured to automatically scan and perform other additional processing actions, such as to transmit, e.g. email or fax, a digital representation of a document to a destination device, via the communication port 211. With reference to FIG. 4, a method for instant transmission of a document may include detecting a trigger event 401 that is indicative that the document is placed on the document handler or the portable memory device is plugged in the scanning device. In one embodiment, detecting the trigger event may include detecting that a document is placed on the document handler. In another embodiment, or additionally, detecting the trigger event may include detecting that a portable memory device is plugged into the port of the scanning device. For example, the user has plugged a USB flash drive into the scanning device. The USB flash drive may have a designated folder for storing scan instructions related to transmitting a document. For example, the "\insta-email" folder may store email instructions and the "\insta-fax" folder may store fax instructions.

In one embodiment, an instruction file may be stored in the portable memory device in the designated folder for email, such as "\insta-email." The instruction file may contain details required for email one or more documents, and at least an address of a destination device, such as an email address of the recipient. For example, the instructions may include "To," such as john.doe1@abc.com; john.doe2@abc.com; john.doe3@abc.com (multiple recipients' names are separated by ";"). Additionally, the instruction file may contain additional transmit settings related to email transmission, each setting may contain multiple items separated by a delimiter such as semi-column. For example, the instruction file may contain "CC" (e.g. john.doe4@abc.com; john.doe5@abc.com; john.doe6@abc.com), "BCC," "From" (e.g. joh.doe@xerox.com), "Subject" (e.g. "Scanned from Xerox MFD"), and "Body" (i.e. an automated message to be included in the email, such as "This email is generated by a workflow on a multi-function peripheral"). Some of the above settings such as "To" may be required, whereas some settings may be optional. The scanning device may store default values for optional settings. When an instruction file also contains optional settings, the system may override the default settings with the values stored in the instruction file.

Alternatively and/or additionally, an instruction file for fax may be stored in the portable memory device in a designated folder, such as "\insta-fax," and the instruction file may include details required for fax, and at least an address of the destination device such as a fax number of the recipient. Additionally, the instruction file may include multiple fax numbers for multiple recipients, with multiple fax numbers being separated by delimiters such as "," or ";" or other characters. The fax number that is included in the instruction file may also contain area code, country code or a phone number in any format. Alternatively and/or additionally, the instructions for fax may also contain other settings such as the recipient name, the cover page, the note on the cover page, the fax resolution, the total fax page number, the fax mode (e.g. picture/document mode), the fax protocol (e.g. fax protocols supported by PSTN or fax over IP protocols such as T.38) and/or fax compression types, such as CCITT Group 4.

With further reference to FIG. 4, once the scanning device detects the trigger event 401, the scanning device may identify the designated folder on the portable memory device by its name 402, e.g. "\insta-email" or "\insta-fax," and retrieve instruction file from the designated folder 403. Similar to embodiments described in FIG. 3, the scanning device may detect the trigger event by first detecting that a document is placed on the document handler. If the portable memory device is not plugged in or paired with the scanning device, the scanning device may output a message to the user to prompt the user to connect the portable memory device. Alternatively, the scanning device may detect a trigger event by first detecting that a portable memory is connected to or paired with the scanning device. The scanning device may then check whether a document is loaded to the document handler. If no document is placed on the document handler, the scanning device may output a message to the user to prompt the user to load a document.

With further reference to FIG. 4, the scanning device will then extract the address of the destination device, such as an email address or a fax number from the instruction file 404. Additionally, the scanning device may also extract other settings related to transmission of documents from the instruction file 405, such as "From," "CC," "Subject" etc. for email transmission or settings related to facsimile transmission, such as the recipient name, the cover page, the note to be included in the fax, the fax resolution, the compression type, and/or the total fax page number. The instruction file may be stored as a "txt" or CSV (comma separated values) or spread sheet file such as a Microsoft Excel file, with details required for each type of transmission. Alternatively, the instruction file may also be stored as an XML file.

With further reference to FIG. 3, upon detecting the trigger event and retrieving the transmission settings, the scanning device may scan a document 406, which may consist of a single or multiple pages, based on the transmission settings, and transmit the digital representation of the scanned document to the destination device 407 at the extracted email address or fax number. The scanning device may also include additional program instructions that will parse an address that has multiple entries, such as multiple email addresses or multiple fax numbers delimited by a special character (e.g. a comma, tab, semi-column, or a space), then automatically transmit the digital representation of the scanned document to multiple recipients.

The steps described above can repeat for transmitting additional sets of documents, while each set of documents may contain single or multiple pages. In one embodiment, upon a user placing an additional set of documents on the document handler, the scanning device will detect that an additional document has been placed on the document handler, and then repeat the steps of scanning the document 406 and transmitting the digital representation of the scanned document to the same destination device 407. For example, the scanning device is scanning and emailing the first set of originals to a destination email address. Upon the user placing an additional set of originals, the scanning device may scan the additional set of originals and transmit the digital representation of the scanned document to the same destination email address. The scanning device may repeat the same process for any number of additional documents, or until the user unplugs the portable memory device from the scanning device. Alternatively and/or additionally, the scanning device may repeat the scanning and transmitting steps in the same manner for fax operations, i.e. allow the user to place an additional set of documents upon completion of each fax and the scanning device will scan and fax the additional set of documents to the same destination fax number.

With further reference to FIG. 4, additionally, the method may allow the system or user to limit the total number of transmissions. This max count may be defined in the transmission settings that are stored on the portable memory device or may be stored as a default setting in the scanning device. In one embodiment, the scanning device may retrieve the transmission settings from the portable memory device and identify the max count of transmissions 411. Once a max count of transmissions is identified, each time the scanning device is repeating the transmission steps described above, the scanning device may additionally count the total number of transmissions 408 and check this number against the max count of transmissions 409. If the scanning device determines that the total number of transmissions exceeds the max count of transmissions, the scanning device may suspend the transmission 410 (e.g. email or fax) and switch to perform other additional processing actions; otherwise, the scanning device may continue scanning and transmitting additional sets of documents.

In some embodiments, the system may include additional features to allow a user to work with different transmission types or scanning operations without requiring the user to unplug and plug the portable memory device. For example, in one embodiment, the scan instructions include the maximum count of scans. Upon reaching the maximum count of scans, the scanning device will switch to other operations, such as email or fax, without requiring user to unplug the portable memory device. In one embodiment, the system may allow the user to pre-configure multiple folders for different processing actions, or different folders for a certain type of processing action. For example, the user may pre-configure the portable memory device to have both "\insta-email" and "\insta-fax" for storing and emailing/faxing documents. In another example, the user may also pre-configure the portable memory device to have "\insta-scan1" and "\insta-scan2," each storing different scan instructions for scanning and storing scanned documents to the portable memory device.

When multiple designated folders exit on the portable memory device, the scanning device may provide the user with a simple interface to select which operation the user wants to perform at this time. For example, when both "\insta-email" and "\insta-fax" folders co-exist, the scanning device may simple prompt the user to select email or fax on the LUI. When the scanning device receives user's selection on which operation to perform, the scanning device may proceed with retrieving scan instructions for the selected operation from the corresponding designated folder and perform the selected operation without further interaction from the user, as described in various embodiments in FIGS. 3 and 4.

In some embodiments, similar to scanning, pre-configuration of transmission settings may be accomplished by allowing a user to plug in the portable memory device on the user's own computer (110 in FIG. 1) and pre-configure the transmission settings on the portable memory device through a web-UI. In a networked document system, if an application is available for user to modify network and system settings on the system from a user's computer, each user can also use the application to frequently change the default settings. For example, each user may be given a separate "insta-email" and/or "insta-fax" page to pre-configure or modify the default settings. This can be a one-time activity or the user can change it any time. Alternatively and/or additionally, the system may enhance the security of transmission operations by requiring user to enter password at some point, such as before or after scanning the documents to be transmitted. This option of requiring password may be included in the scan instructions stored either on the portable memory device or in the scanning device.

FIG. 7 depicts an example of internal hardware that may be included in any of the electronic components of the system, the scanning device or another device in the system such as the system 110, 120 (in FIG. 1). An electrical bus 500 serves as an information highway interconnecting the other illustrated components of the hardware. Processor 505 is a central processing device of the device, configured to perform calculations and logic operations required to execute programming instructions. As used in this document and in the claims, the terms "processor" and "processing device" may refer to a single processor or any number of processors or processor cores in one or more processors. The device may include read only memory (ROM) 510, random access memory (RAM) 515. Other types of memory devices, such as flash memory, hard drives and other devices capable of storing electronic data constitute examples of memory devices 510. A memory device may include a single device or a collection of devices across which data and/or instructions are stored.

An optional display interface 530 may permit information from the bus 500 to be displayed on a display device 545 in visual, graphic or alphanumeric format. An audio interface and audio output (such as a speaker) also may be provided. Communication with external devices may occur using various communication ports or devices 540 such as a portable memory device reader/writer, a transmitter and/or receiver, an antenna, an RFID tag and/or short-range or near-field communication circuitry. The communication device 540 may be attached to a communications network, such as the Internet, a local area network or a cellular telephone data network.

The hardware may also include a user interface sensor 545 that allows for receipt of data from input devices 550 such as a keyboard, a mouse, a joystick, a touchscreen, a remote control, a pointing device, a video input device (camera) and/or an audio input device (microphone). Various methods of activation, validation and/or authorization described in this document may be performed by the central processing device 505 or a controller 520.

The above-disclosed features and functions, as well as alternatives, may be combined into many other different systems or applications. Various components may be implemented in hardware or software or embedded software. Various presently unforeseen or unanticipated alternatives, modifications, variations or improvements may be made by those skilled in the art, each of which is also intended to be encompassed by the disclosed embodiments.

The invention claimed is:

1. A scanning device for automatically scanning and processing a document, comprising:
   a port for communicating with a portable memory device having a file system having a folder of a designated name;
   an image sensor;
   a processing device communicatively coupled to the port and the image sensor; and
   a non-transitory computer-readable medium containing program instructions that are configured to, when executed, cause the processing device to:
      detect a trigger event, wherein detecting the trigger event comprises detecting that the portable memory device is communicatively connected to the port,
      upon detecting the trigger event, automatically retrieve a scan instruction from the folder of the designated name on the portable memory device, the scan instruction comprising at least one scan setting,
      automatically cause the image sensor to scan a physical document and generate a digital document file corresponding to the scanned document based on at least the retrieved scan instruction, and
      perform a processing action on the digital document file based on at least the retrieved scan instruction.

2. The device of claim 1, wherein:
   the scanning device also comprises a document handler; and
   detecting the trigger event also comprises detecting that the physical document is placed on the document handler.

3. The device of claim 1, wherein the processing action comprises storing the digital document file in the folder having the designated name on the portable memory device.

4. The device of claim 1, wherein:
   the scan instruction also comprises an address of a destination device; and
   the processing action comprises transmitting the digital document file to the address of the destination device.

5. The device of claim 4, wherein:
   the address of the destination device comprises one or more email addresses; and
   transmitting the digital document file comprises transmitting the digital document file to the one or more email addresses via email.

6. The device of claim 4, wherein:
   the address of the destination device comprises one or more fax numbers; and
   transmitting the digital document file comprises transmitting the digital document file to the one or more fax numbers by facsimile.

7. The device of claim 1, wherein:
   the file system of the portable memory device has one or more additional folders of different designated names, each folder storing instructions to perform a different additional processing action; and
   the program instructions are further configured to:
      detect an additional folder of a different designated name, and
      perform an additional processing action corresponding to the additional folder of the different designated name.

8. The device of claim 1, wherein the program instructions are further configured to:
   upon detecting that the trigger event has occurred, detect whether a physical document is placed on a document handler of the scanning device; and
   if a physical document is not placed on the document handler, output a message via a user interface to prompt a user to load a physical document to the document handler.

9. The device of claim 2, wherein the computer-readable medium comprises additional program instructions that will cause the processing device to:
   upon performing the processing action on the digital document file for the scanned document, detect an additional trigger event, wherein detecting the additional trigger event comprises detecting that an additional physical document is placed on the document handler;
   automatically cause the image sensor to scan the additional document and generate a digital document file for the additionally scanned document based on the retrieved scan instruction; and
   automatically perform the additional processing action on the digital document file of the additional document based on the retrieved scan instruction.

10. The device of claim 9, wherein the scan instruction also comprises a maximum number of scans, and wherein the computer-readable medium comprises additional program instructions that will cause the processing device to:
    count a number of scans after scanning each additional document; and
    suspend scanning additional documents when the number of scans exceeds the maximum number of scans.

11. The device of claim 3, wherein the physical document comprises multiple pages and the scan instruction further comprises a one-file-per-page setting, and wherein storing the digital document file to the portable memory device comprises automatically storing multiple digital document files to the portable memory device, each document file containing a digital representation of a page of the document.

12. A method for automatically scanning and processing a document in a document system, comprising:
    detecting, by a processing device, a trigger event, wherein:
        the processing device is communicatively coupled to an image sensor and a port of a scanning device, and
        detecting the trigger event comprises detecting that a portable memory device is communicatively connected to the port of the scanning device;
    upon detecting the trigger event, automatically retrieving, by the processing device, a scan instruction comprising at least one scan setting from a folder of a designated name on the portable memory device;
    automatically causing, by the computing device, the scanning device to scan a physical document and generate a digital document file for the scanned document based on at least the retrieved scan instruction; and
    automatically performing a processing action on the digital document file based on at least the retrieved scan instruction.

13. The method of claim 12, wherein:
    the scanning device also comprises a document handler; and
    detecting the trigger event also comprises detecting that the physical document is placed on the document handler.

14. The method of claim 12, wherein performing the processing action comprises storing the digital document file in the folder having the designated name on the portable memory device.

15. The method of claim 12, wherein:
    the scan instruction also comprises an address of a destination device; and
    performing the processing action comprises transmitting the digital document file to the address of the destination device.

16. The system of claim 15, wherein:
    the address of the destination device comprises one or more email addresses; and
    transmitting the digital document file comprises transmitting the digital document file to the one or more email addresses via email.

17. The method of claim 15, wherein:
    the address of the destination device comprises one or more fax numbers; and
    transmitting the digital document file comprises transmitting the digital document file to the one or more fax numbers by facsimile.

18. The method of claim 12, wherein:
    the file system of the portable memory device has one or more additional folders of different designated names, each folder storing instructions to perform a different additional processing action; and
    the method further comprises:
        detecting an additional folder of a different designated name, and
        performing an additional processing action corresponding to the additional folder of the different designated name.

19. The method of claim 12 further comprising:
    upon detecting that the trigger event has occurred, detecting whether a physical document is placed on a document handler of the scanning device; and
    if a physical document is not placed on the document handler, outputting a message via a user interface to prompt a user to load a physical document to the document handler.

20. The method of claim 13 further comprising:
    upon performing the processing action on the digital document file for the scanned document, detecting an additional trigger event, wherein detecting the additional trigger event comprises detecting that an additional document is placed on the document handler;
    automatically causing the image sensor to scan the additional document and generate a digital document file for the additionally scanned document based on the retrieved scan instruction; and
    automatically performing the additional processing action on the digital document file of the additional document based on the retrieved scan instruction.

21. The method of claim 20 further comprising:
    extracting a maximum number of scans from the scan instruction;
    counting a number of scans after scanning each additional document; and
    suspending scanning additional document when the number of scans exceeds a maximum number of scans.

22. The method of claim 14, wherein the physical document comprises multiple pages and the scan instruction further comprises a one-file-per-page setting, and wherein storing the digital document file to the portable memory device comprises automatically storing multiple digital document files to the portable memory device, each document file containing a digital representation of a page of the document.

23. The method of claim 12 further comprising preconfiguring the instruction file through a web-UI or a device.

* * * * *